March 6, 1951 F. JOHNSON 2,544,025
PULLING AND COMMINUTING DEVICE FOR
PLANTS, STALKS, AND THE LIKE
Filed March 9, 1949 5 Sheets-Sheet 1
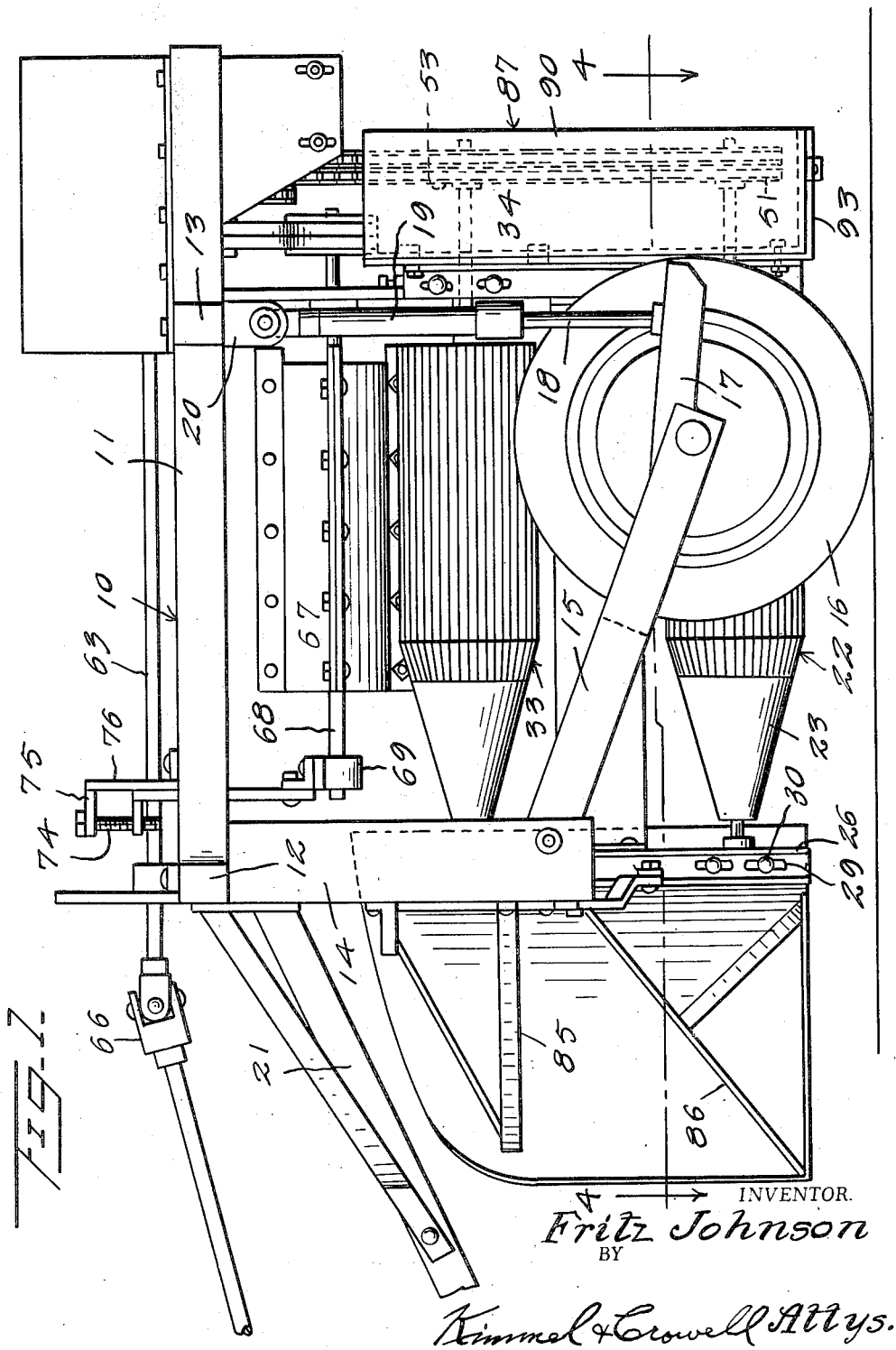
INVENTOR.
Fritz Johnson
BY
Kimmel & Crowell Attys.

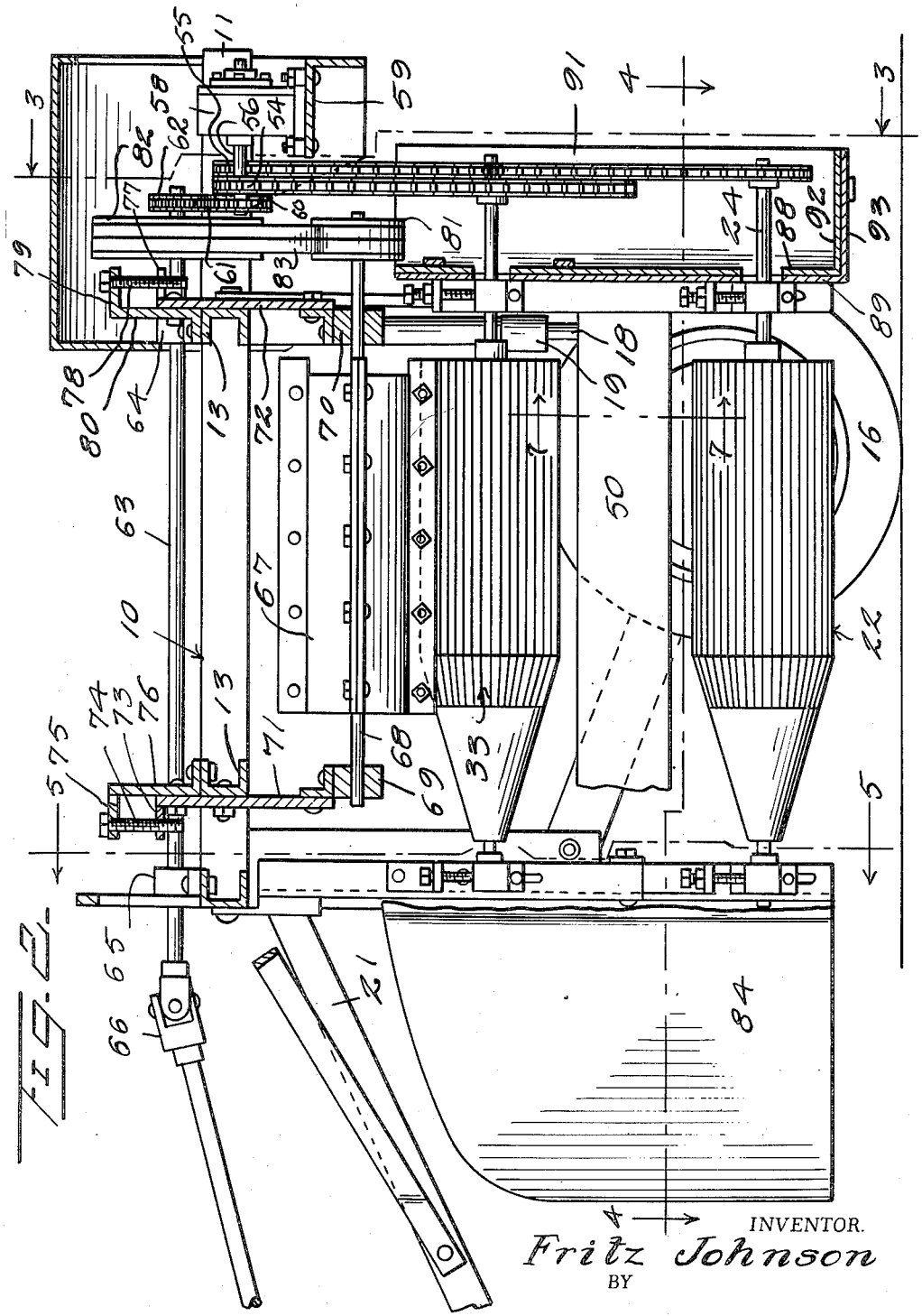

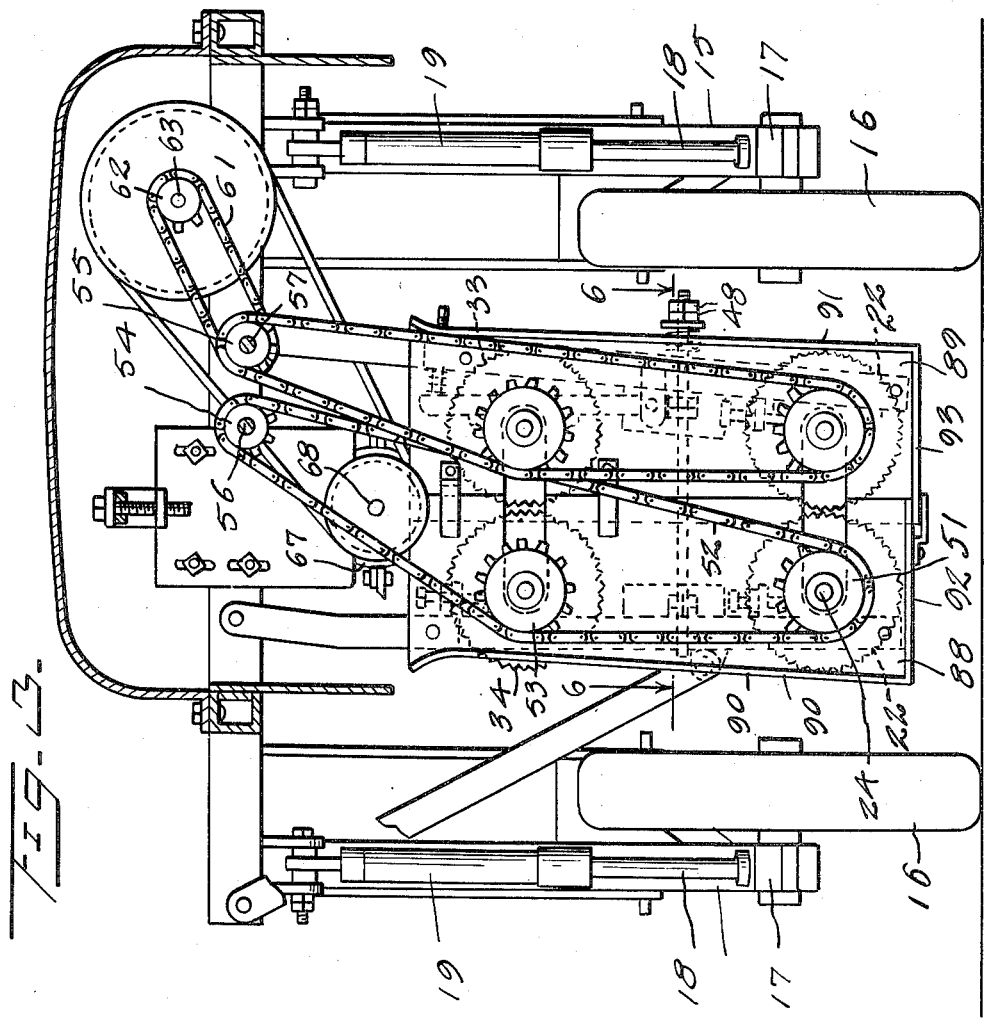

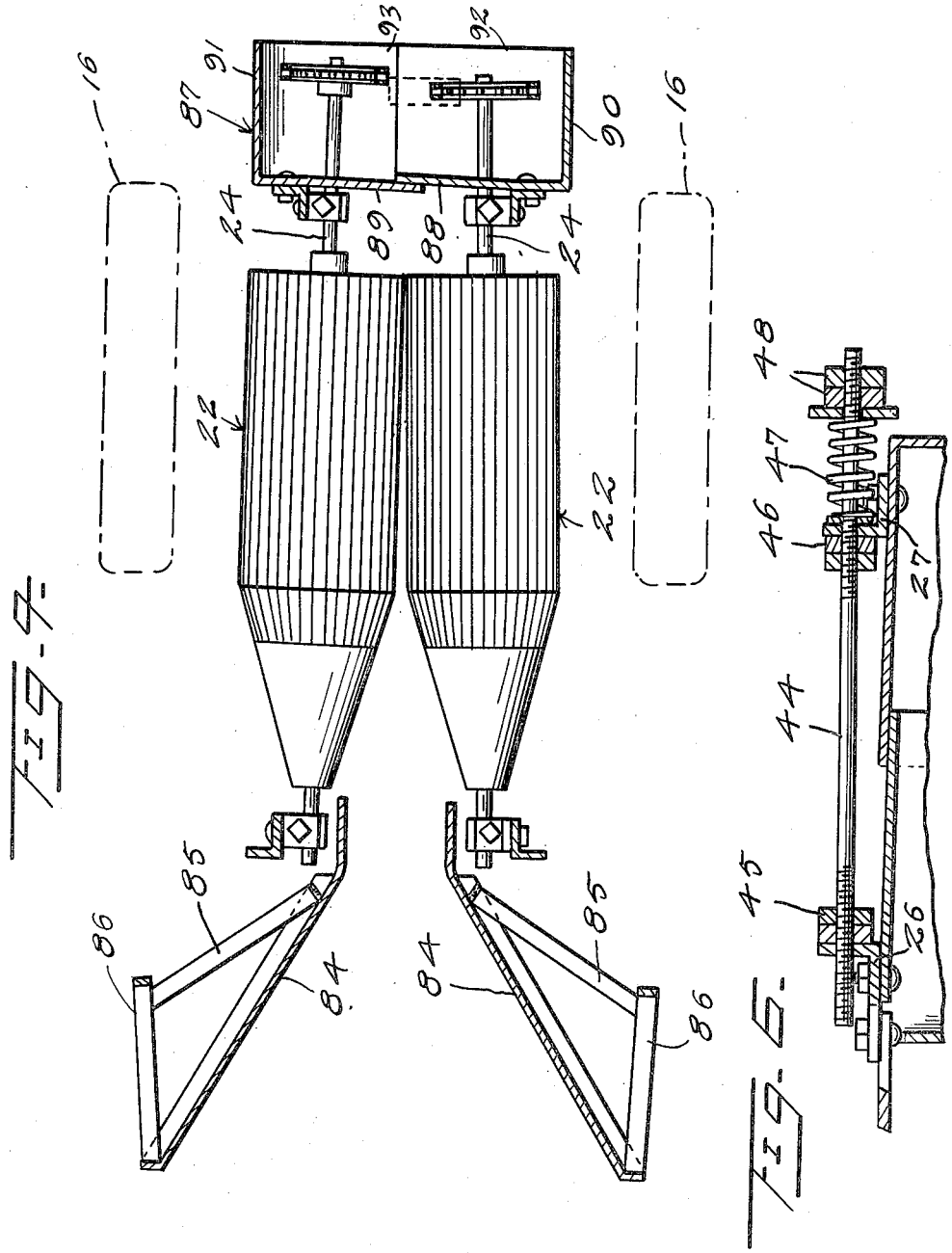

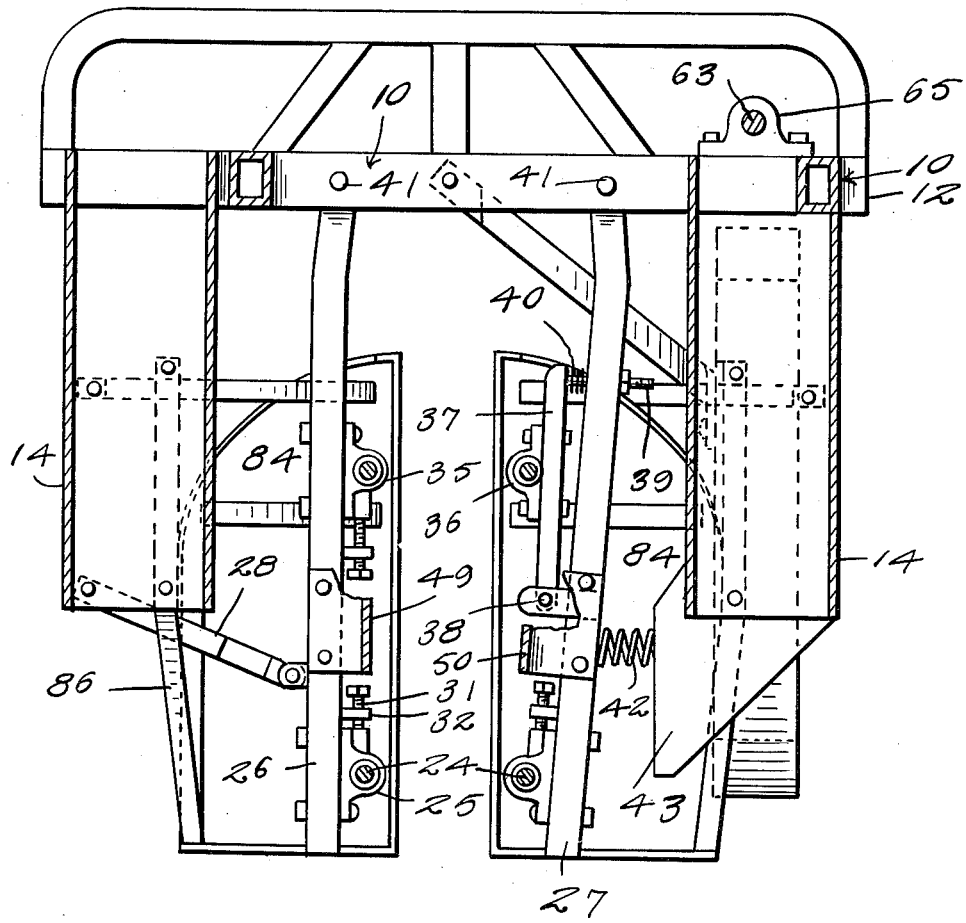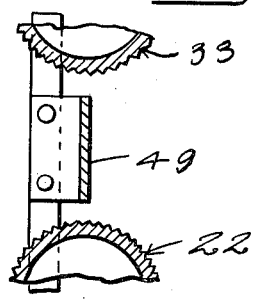

Patented Mar. 6, 1951

2,544,025

UNITED STATES PATENT OFFICE 2,544,025

PULLING AND COMMINUTING DEVICE FOR PLANTS, STALKS, AND THE LIKE

Fritz Johnson, Idaho Falls, Idaho

Application March 9, 1949, Serial No. 80,416

3 Claims. (Cl. 55—61)

This invention relates to pulling and comminuting device for plants, stalks or the like.

An object of this invention is to provide a pulling and comminuting device which has been designed for pulling cotton plants, corn stalks or other relatively heavy stalk plants out of the ground, crushing the stalks, and finally cutting the crushed stalks or plants and distributing the cut stalks or plants over the ground surface.

Another object of this invention is to provide a device of this kind which can be readily adjusted to pull plants or stalks of different sizes and having different root strength so that the entire root and plant or stalk will be pulled and cut up into small pieces which will readily decompose and form fertilizer.

With the above and other objects in view, my invention consists in the arrangement, combination and details of construction disclosed in the drawings and specification, and then more particularly pointed out in the appended claims.

In the drawings,

Figure 1 is a detail side elevation, partly broken away, of a stalk puller and cutter constructed according to an embodiment of this invention, Figure 2 is a vertical section taken substantially through the center of the machine, Figure 3 is a sectional view taken on the line 3—3 of Figure 2, Figure 4 is a sectional view taken on the line 4—4 of Figures 1 and 2, Figure 5 is a sectional view taken on the line 5—5 of Figure 2, Figure 6 is a fragmentary sectional view taken on the line 6—6 of Figure 3, Figure 7 is a fragmentary sectional view taken on the line 7—7 of Figure 2.

Referring to the drawings, the numeral 10 designates generally a mobile frame formed of longitudinal frame members 11 and transverse front and rear frame members 12 and 13.

The frame 10 has secured to the forward portion thereof a pair of depending channel members 14 on the lower ends of which are pivotally mounted wheel carrying levers 15. The levers 15 each have a wheel 16 rotatably secured thereto and each lever 15 is provided with an extension 17 to the upper side of which is secured a plunger 18 slidable in a hydraulic cylinder 19.

The hydraulic cylinder 19 is pivotally secured to a bracket 20 carried by the upper ends of the transverse frame members 13. The frame member 14 also includes a drawbar 21 by means of which the frame is adapted to be connected to a tractor. A pair of lower pulling rollers 22 are rotatably carried by the frame 10, the rollers 22 being longitudinally ribbed over the main body thereof, and each roller 22 at its forward end is tapered as indicated at 23.

The rollers 22 are rotatably carried by roller shafts 24 journalled in vertically adjustable bearings 25 which are secured to depending bearing supporting bars 26 and 27. As shown in Figure 4, the rollers 22 are disposed in forwardly divergent relation so that the plants or stalks can readily engage between the cylindrical portions of the rollers and as the machine moves forwardly the stalks or plants will be gripped under increasing pressure so that the plants or stalks will be positively pulled with the roots from the ground.

The bearing supporting bar 26 is fixed relative to the frame 10, being braced at its lower portion by a brace 28 which is connected between the bar 26 and a channel member 14. The bearings 25 are adjusted by providing elongated slots 29 in the bars 26 and 27 and bolts 30 are adjustable lengthwise of the slots 29, the adjustment being closely regulated by means of an adjusting bolt 31 which is threaded through a lug 32 fixed to a supporting bar 26. The bolt 31 is adapted to bear against the upper side of the bearing 25 so as to adjust this bearing downwardly to the desired degree.

A second pair of rollers 33, similar to the rollers 22, are disposed above the rollers 22, being secured to roller shafts 34 which are journalled through bearings 35 and 36. The bearings 35 are vertically adjustable and secured to the fixed supporting bars 26, whereas the bearings 36 are secured to adjustable bars 37 pivotally secured on pivots 38 carried by the bars 27. The bars 37 are adjusted by means of adjusting bolts 39 and a spring 40 is interposed between the bars 27 and 37, being positioned about the bolts 39 so as to constantly urge the bars 37 inwardly.

The roller supporting bars 27 are adjustable to provide for the desired gripping of the plants or stalks and these bars 27 are pivotally mounted at their upper ends as at 41, on the frame 10. A lever tensioning spring 42 is interposed between the lever or supporting bar 27 and an extension plate 43 which projects below one of the channel members 14, as shown in Figure 5. The rearmost supporting bars 26 and 27 are tied together by means of a tie rod 44, as shown in Figure 6, which is fixed relative to the fixed support 26 by means of nuts 45, and the rod 44 adjacent the support 27 has disposed thereon a pair of stop nuts 46 which limit the inward movement of support or lever 27.

A spring 47 is disposed about the rod 44 on the outer side of the support or lever 27 and is tensioned by means of spring tensioning nuts 48 threaded onto the rod 44. A plate or guide 49 is secured between the fixed supporting bars 26 and between the rollers 22 and 33, and a second plate or guide 50 is fixed between the adjustable supports or levers 27 and between the rollers 22 and 33.

The two lower roller shafts 24 have fixed thereon sprockets 51 about which chains 52 engage. The upper roller shafts 34 have fixed thereto sprockets 53 and the chains 52 also are trained on one run thereof about the sprockets 53. The chains 52 at their upper ends engage about sprockets 54 and 55 which are secured to shafts 56 and 57 respectively. The shafts 56 and 57 extend from a gear housing 58 which is fixed on a horizontally disposed supporting plate 59 secured between the longitudinal frame members 11 at the rear of the latter.

The gear housing 58 has a pair of gears of conventional construction mounted therein so that shaft 57 will rotate oppositely from shaft 56. Shaft 57 has mounted thereon a second sprocket 69 about which a driving chain 61 engages. The chain 61 is also trained about a driving sprocket 62 which is mounted on a driving shaft 63. The shaft 63 is journalled through bearings 64 and 65 carried by the frame 10 and the forward end of the shaft 63 is adapted to be connected to the power take-off of the tractor.

A universal joint 66 is interposed in the shaft 63 at the forward portion of the frame 10 as shown in Figure 2. A rotatable cutter 67 is disposed above the upper rollers 33, being mounted on a shaft 68 which is journalled through bearings 69 and 70 carried by vertically adjustable bearing supporting plates 71 and 72. The plate 71 is formed at its upper end with a right angularly disposed lug or ear 73 through which an adjusting bolt 74 is threaded, and the bolt 74 engages through an ear or lug 75 carried by a plate 76 which is fixed to the forward transverse frame member 13.

The bearing plate 72 is adjustable in the same manner as the bearing plate 71, being provided at its upper end with a lug 77 through which an adjusting bolt 78 is threaded. The bolt 78 engages through an ear or lug 79 carried by a vertically disposed fixed plate 80 which is fixedly secured to the rear transverse frame member 13.

The shaft 68 at its rear end has fixed thereto a pulley 81 and the shaft 63 has mounted thereon a relatively large driving pulley 82 about which a pair of belts 83 engage. The belts 83 engage about the pulley 81 so that the cutter 67 will be rotated at a relatively rapid rate. The cutter 67 is adjusted to be positioned slightly above the upper rollers 33, as shown in Figure 2, in order that the plants or stalks which are moved upwardly by the upper rollers 33 will be cut into relatively small pieces as these plants or stalks emerge from between the upper rollers 33. In practice the upper rollers 33 are designed to substantially crush or flatten the stalks or trunks of the plants so that these stalks or trunks will be readily cut into small pieces and these pieces then blown laterally of the machine by the rapid rotation of the cutter 67. The small pieces are discharged onto the ground laterally of the machine and are adapted to be plowed under for use as fertilizer. By providing for the crushing of the stalks or plants, the decomposing period of such stalks or plants will be materially shortened.

In order to provide for guiding the plants or stalks toward the rollers as the machine moves over the ground, a pair of forwardly divergent guiding wings 84 are secured forwardly of the rollers 22 and 33, being braced in forwardly divergent relation by bracing bars 85 and 86 which are secured to the forward roller supporting bars 26 and 27.

The sprockets and chains for the pulling rollers are protected against contact by plants, stalks or the like by means of an expansible shield 87 which is open at the rear, and is formed of a pair of shield members having overlapping front walls 88 and 89 secured to the rear supports 26 and 27. Rearwardly extending side walls 90 and 91 respectively, extend from the side walls 88 and 89 and overlapping bottom walls 92 and 93 extend inwardly from the side walls 88 and 89.

In the use and operation of this machine, the wheels 16 are adapted to straddle a row with the rollers 22 and 33 engaging in alignment with or over the row of plants or stalks. The machine is adjusted vertically by the hydraulic means 18 and 19 so that the lower rollers 22 will be in a proper position to grip the plants or stalks at the lower portion thereof. These plants will be jerked upwardly by the lower rollers 22 and the roots of the plants will also be pulled from the ground. Any dirt adhering to the roots will be loosened by passing of the stalks between the lower rollers 22 and also by passing of the stalks between the upper rollers 33. As the stalks emerge from between the upper rollers 33 and such stalks are flattened or crushed by the upper rollers 33, the cutter 67 will cut the emerging stalks into small pieces which will be blown laterally by the cutter 67 and will fall onto the ground laterally of the machine. It will, of course, be understood that this device may be constructed to pull and cut two or more rows of plants in one pass over the ground, it only being necessary to add additional pairs of pulling and crushing rollers and enlarging the frame to accommodate the additional rollers and associated apparatus.

I do not mean to confine myself to the exact details of construction herein disclosed, but claim all variations falling within the purview of the appended claims.

What I claim is:

1. A stalk puller comprising a mobile frame having a front and rear, superposed pairs of pulling rollers disposed longitudinally of said frame and in side by side relation, a pair of depending roller supporting bars fixedly carried by said frame and disposed adjacent the ends of one roller of each pair, bearings for one roller of each pair carried by said bars, a second pair of depending roller supporting bars disposed adjacent the ends of the other rollers of each pair, means pivotally securing said second pair of bars to said frame, bearings for the other rollers of each pair carried by said second pair of bars, means vertically adusting said bearings on said bars to dispose said pairs of rollers in adjusted position one pair relative to the other pair, tensionable adusting means between said second pair of bars and said frame urging said other rollers toward said first mentioned rollers of each pair, and means for rotating said rollers.

2. A stalk puller comprising a mobile frame, superposed pairs of pulling rollers disposed longitudinally of said frame and in side by side relation, a pair of depending roller supporting bars fixedly carried by said frame and disposed adjacent the ends of one roller of each pair, bearings for one roller of each pair carried by said bars, a second pair of depending roller supporting bars disposed adjacent the ends of the other rollers of each pair, means pivotally securing said second pair of bars to said frame, bearings for the other roller of each pair carried by said second pair of bars, tensionable adjusting means between said second pair of bars and said frame urging said other rollers toward said first mentioned rollers of each pair, a cutter disposed above the upper pair of rollers, means rotatably mounting said cutter on said frame with the axis thereof lengthwise of the frame and in a plane intermediate the mounting of the upper pair of rollers, said cutter having longitudinal blades radial to to the axis of rotation of the cutter, and means for rotating said rollers and cutter.

3. A stalk puller comprising a mobile frame having a front and rear, superposed pairs of pulling rollers below said frame, a pair of depending roller supporting bars fixedly carried by said frame at the front and rear thereof and disposed adjacent the ends of one roller of each pair, bearings for said rollers carried by said bars, a second pair of depending roller supporting bars disposed adjacent the ends of the other rollers of each pair, means pivotally securing said second pair of bars to the front and rear of said frame, bearings for the other rollers of each pair carried by said second pair of bars, tensionable adjusting means between said second pair of bars and said frame urging said other rollers toward said first mentioned rollers of each pair, a cutter rotatably carried by said frame and disposed above and longitudinally of the upper pair of rollers, said cutter including longitudinally disposed blades radial to the axis of rotation of the cutter adapted upon rotation of said cutter to cut the stalks rising from said rollers and disperse the cut stalks laterally of said frame, and means for rotating said rollers and cutter.

FRITZ JOHNSON.

REFERENCES CITED

The following references are of record in the file of this patent:

UNITED STATES PATENTS

| Number | Name | Date |
| --- | --- | --- |
| 1,205,721 | Elkins | Nov. 21, 1916 |
| 1,358,302 | Ellis | Nov. 9, 1920 |
| 1,379,571 | Jones | May 24, 1921 |
| 1,713,197 | Spell | May 14, 1929 |
| 1,821,131 | Bailey | Sept. 1, 1931 |
| 2,314,773 | Dahlman | Mar. 23, 1943 |
| 2,434,124 | Schaaf et al. | Jan. 6, 1948 |